Dec. 6, 1927.
W. G. BLACK
1,651,663
CROWN BLOCK BEARING FOR OIL WELLS
Filed May 11, 1921
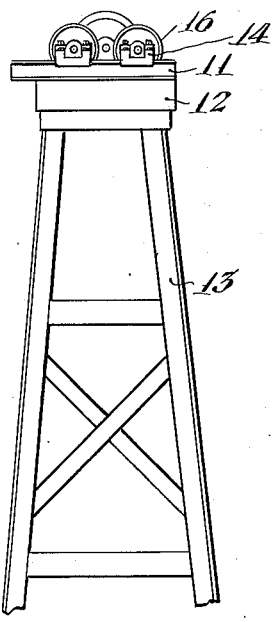
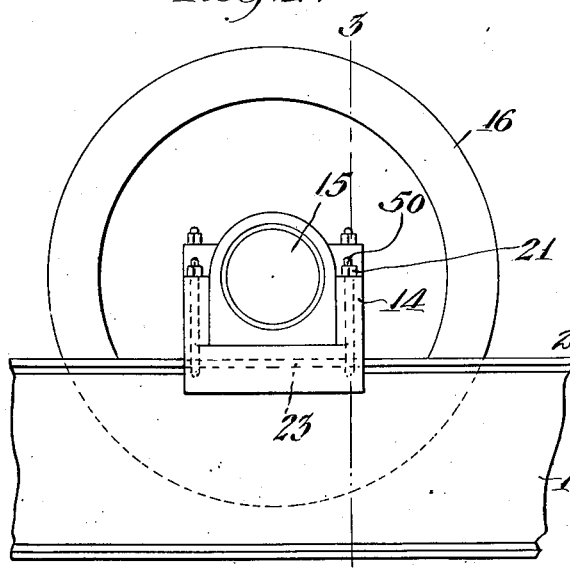
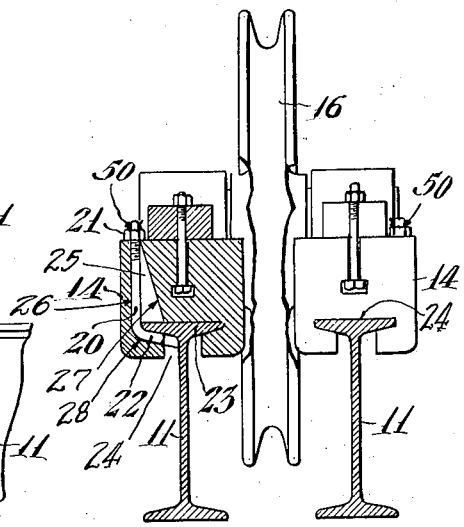
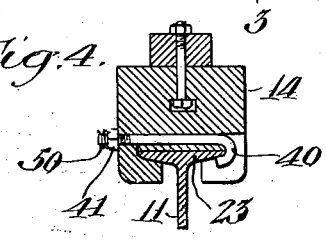
Inventor
Walter G. Black
by Graham + Harris
Attorneys Patented Dec. 6, 1927.

1,651,663

UNITED STATES PATENT OFFICE.

WALTER G. BLACK, OF WHITTIER, CALIFORNIA, ASSIGNOR TO EMSCO DERRICK & EQUIPMENT COMPANY, OF LOS ANGELES, CALIFORNIA, A CORPORATION OF CALIFORNIA.

CROWN-BLOCK BEARING FOR OIL WELLS.

Application filed May 11, 1921. Serial No. 468,715.

My invention relates to bearing blocks such as are used at the crown block of an oil well derrick. These bearing blocks support shafts on which sheaves are carried, the various cables used in the derrick passing over these sheaves. Inasmuch as these cables must pass down into the derrick, it is impracticable to close the top of the derrick entirely. The standard forms of bearing blocks used in other types of machinery, if used on a crown block, are objectionable because they have loose parts which may become detached and fall through the top of the derrick to the derrick floor below, thus injuring the operators working upon this floor. This is particularly true of the bolts used to attach the bearing blocks to the crown block structure.

The principal object of my invention is to provide bearing blocks in which the ordinary type of bolts are dispensed with and in which securing means are provided which are so constructed that they cannot become disengaged and fall through the derrick. Where the ordinary bolted types of bearing blocks are used, it is common practice to drill the supporting structure with a plurality of holes so that the bearing blocks may be moved on the supporting structure to give the proper lead to the ropes and to properly align the bearing blocks.

It is a further object of my invention to provide bearing blocks which are so constructed that they can be instantly adjusted across the derrick without the necessity of drilling any additional holes.

It is a further object of my invention to provide an adjustable bearing block of this type which can be moved a very small distance if desired.

Further objects and advantages will be made evident hereinafter.

Referring to the drawings which are for illustrative purposes only,

Fig. 1 is a view of the top of the derrick showing the crown block and its supported machinery in place thereon.

Fig. 2 is a view on an enlarged scale showing a portion of this machinery.

Fig. 3 is a view partly in section on the line 3—3 of Fig. 2.

Fig. 4 is a similar section through an alternate form of my invention.

In the form of the invention shown, I-beams 11 are supported on the crown block 12 of the derrick 13. Two or more I-beams 11 may be used if desired. Supported on these I-beams are bearing blocks 14 which are channeled out and formed with longitudinal undercut grooves 24 in the bottom to fit tightly over the top and top flanges of the I-beam 11 and to slide freely thereon. Shafts 15 are carried in the bearing blocks 14 and sheaves 16 are mounted on the shafts.

For the purpose of locking the bearing blocks 14 on the I-beams 11, the clamping bolts 20, shown in Fig. 3, may be used. These bolts extend upwardly through said bearing blocks through recesses 25 which are formed in said bearing blocks. The outer walls 26 of said recesses are vertical, while the inner walls 27 are inclined inwardly from the top thereof. The lower ends 28 of the recesses 25 form channels in the upper faces of inwardly extending walls of the groove 24. Screwed on the upper ends of the bolts 20 are nuts 21 so that these nuts bear against the upper face of the bearing blocks 14 and draw the bolts upwardly. In order that the lower ends of each bolt 20 may fit into the lower ends 28 of the recesses 25 in which the bolts 20 are discharged, the lower ends of each bolt 20 are bent from the shank thereof to form a bent portion or head 22.

In assembling the bolts 20 upon the bearing blocks 14, each bolt 20 has its nut 21 removed and it is inserted upwardly into its respective recess 25 so that the head 22 may be swung outwardly to a position of rest in the lower portion 28 of that recess 25. When each bolt 20 is in this position, its nut 21 may be screwed upon its upper end. With the bolts in this position, the bearing blocks 14 may be slipped over a flange 23 provided on the I-beams 11 with the flange 23 extending into the groove 24. When the bearing blocks 14 have been properly positioned upon the I-beams 11, the nuts 21 are tightened upon the bolts 20 so as to draw the bolt heads 22 upwardly into tight clamping relation with the lower surface of the flanges 23 of the I-beams 11. This rigidly retains the bearing blocks 14 in their proper position upon the I-beams 11.

It is to be noted that when the bearing blocks 14 are slid upon the flanges 23 of the I-beams 11, the bolts 20 are securely retained against rotation by the engagement of the bolt heads 22 with the side walls of the lower portion 28 of the recess 25 in which that bolt is disposed. Furthermore, even though the nuts 21 were removed from the bolts 20, the latter are prevented from accidental removal from the recess 25 in which they are disposed by contact of the heads 22 with the bottom of the recess portion 28. By loosening the nuts 21, the bearing blocks may be moved a short distance on the channels 11, thus allowing the shafts to be accurately lined up in any position. It is possible by hitting the bearing blocks a light blow of the hammer to move them a sixty-fourth of an inch and to clamp them down after they have been so moved.

In the alternate form of my invention shown in Fig. 4, hook bolts 40 are used, these bolts being pulled up with nuts 41 to clamp upon the flanges 23. It will be seen that neither the bolts 40 nor the bolts 20 can come out of the bearing blocks even if the nuts 21 become greatly loosened due to vibration. Cotter pins 50 in the end of the bolts 20 and 40 prevent the nuts 21 and 41 from coming off even if they become loosened.

I claim as my invention:

1. In a device of the character described, the combination of: a crown bearing block provided with a longitudinal undercut groove whereby said block may closely and slidably embrace a supporting beam and be maintained thereon against transverse displacement; a slot in said block opening into the undercut portion of the groove; and means in said slot adapted to engage the beam for fixedly clamping said block to the beam.

2. In a device of the character described, the combination of: a crown bearing block provided with a longitudinal undercut groove whereby said block may closely and slidably embrace a supporting beam and be maintained thereon against transverse displacement; a slot in said block opening into the undercut portion of said groove; and a bolt in said slot bent to engage the supporting beam for fixedly clamping said block to the beam.

3. In a device of the character described, the combination of: a crown bearing block provided with a longitudinal undercut groove whereby said block may closely and slidably embrace a supporting beam and be maintained thereon against transverse displacement; a slot in said block opening into the undercut portion of said groove at one side thereof and positioned substantially at right angles thereto; and means in said slot to engage said beam for fixedly clamping said block to the beam.

4. In a device of the character described, the combination of: a crown bearing block provided with a longitudinal undercut groove whereby said block may closely and slidably embrace a supporting beam and be maintained thereon against transverse displacement; a slot in said block opening into the undercut portion of said groove; and a bolt in said slot bent to engage said beam for fixedly clamping said block to the beam, said slot and said bolt so shaped and positioned as to prevent the withdrawal of said bolt from said slot when said block is mounted.

5. In combination with a supporting beam having a longitudinal T-head: a crown bearing block provided with a longitudinal T-groove for slidably mounting said block on said beam to closely embrace said T-head; a slot opening into said T-groove at an angle thereto; and a bolt in said slot bent to engage the under side of the beam flange for fixedly clamping said block to said beam.

6. In means for securing together a primary member provided with an extending flange and a secondary member having a cavity extending therethrough, the combination of: a bolt extending through said cavity having a head formed on the lower extremity thereof; means for pulling said head against said flange in a manner to clamp said primary and secondary members together, said bolt being formed to interlock with said secondary member for preventing the turning of said bolt in said secondary member when said head is against said flange; and means for preventing the accidental removal of said bolt from said cavity when said primary and secondary members are in contact.

7. In means for securing together a primary member provided with an extending flange, and a secondary member having a cavity extending therethrough, said flange of said primary member extending at right angles to the extension of said cavity, the combination of: a bolt extending through said cavity having a head formed on the lower extremity thereof; means for pulling said head against said flange in a manner to clamp said primary and secondary members together, said bolt being formed to interlock with said secondary member for preventing the turning of said bolt in said secondary member when said head is against said flange; and means for preventing the accidental removal of said bolt from said cavity when said primary and secondary members are in contact.

8. In combination: a primary member; a secondary member adapted to be secured to said primary member; a bolt extending through a cavity formed in said secondary member, and adapted to engage said primary member; means for causing said bolt to secure said primary and secondary members together; and means adapted to prevent a removal of said bolt even though said means for causing said bolt to secure said primary and secondary members together is removed.

9. In combination: a primary member; a secondary member adapted to be secured to said primary member; a bolt extending through a cavity formed in said secondary member, and adapted to engage said primary member; means for causing said bolt to secure said primary and secondary members together; and means adapted to prevent a removal of said bolt while said primary and secondary members are in position to be secured together even though said means for causing said bolt to secure said primary and secondary members together is removed.

In testimony whereof, I have hereunto set my hand at Los Angeles, California, this 20th day of April, 1921.

WALTER G. BLACK.